US011029175B2

(12) United States Patent
Mullis (10) Patent No.: US 11,029,175 B2
(45) Date of Patent: Jun. 8, 2021

(54) METHOD FOR PROCESSING A MEASUREMENT SIGNAL FROM A PRESSURE MEASUREMENT CELL, AND A MEASUREMENT CELL ARRANGEMENT

(71) Applicant: INFICON AG, Balzers (LI)

(72) Inventor: Felix Mullis, Flums (CH)

(73) Assignee: INFICON AG, Balzers (LI)

( * ) Notice: Subject to any disclaimer, the term of this patent is extended or adjusted under 35 U.S.C. 154(b) by 543 days.

(21) Appl. No.: 15/571,160

(22) PCT Filed: Feb. 10, 2016

(86) PCT No.: PCT/EP2016/052810
§ 371 (c)(1),
(2) Date: Nov. 1, 2017

(87) PCT Pub. No.: WO2016/180547
PCT Pub. Date: Nov. 17, 2016

(65) Prior Publication Data
US 2018/0259360 A1 Sep. 13, 2018

(51) Int. Cl.
*G01D 3/036* (2006.01)
*G01L 19/08* (2006.01)
*G01L 19/12* (2006.01)

(52) U.S. Cl.
CPC ............ *G01D 3/036* (2013.01); *G01L 19/083* (2013.01); *G01L 19/12* (2013.01)

(58) Field of Classification Search
CPC ....... G01D 3/036; G01L 19/083; G01L 19/12; G01L 19/00; G01L 19/08
See application file for complete search history.

(56) References Cited

U.S. PATENT DOCUMENTS

| 5,609,136 | A | * | 3/1997 | Tuken | ................... F02D 41/14 123/357 |
| 5,838,599 | A | | 11/1998 | Tao et al. | |
| 2004/0183550 | A1 | * | 9/2004 | Fehrenbach | .......... G01F 23/263 324/662 |
| 2009/0204548 | A1 | * | 8/2009 | Swearingen | ........... G06Q 40/06 705/36 R |
| 2016/0341770 | A1 | * | 11/2016 | Moline | ................ H03K 5/1532 |

FOREIGN PATENT DOCUMENTS

EP 0612149 A1 8/1994

OTHER PUBLICATIONS

International Search Report for related PCT application No. PCT/EP2016/052810 dated Apr. 15, 2016, 4 pages.

* cited by examiner

*Primary Examiner* — Catherine T. Rastovski
*Assistant Examiner* — Liam R Casey
(74) *Attorney, Agent, or Firm* — Procopio, Cory, Hargreaves & Savitch LLP (57) ABSTRACT

Method for determining a pressure in a pressure cell, the method consisting in determining a measuring signal (x) that is at least proportional to a measured pressure in the pressure cell, generating an output signal (y) from the measuring signal (x) using a filter unit (10) comprising a transfer function by at least reducing, preferably eliminating, a noise signal contained in the measuring signal determining a change over time of the measuring signal (x), and setting the transfer function as a function of the change over time of the measuring signal (x). A measuring cell arrangement is also specified.

21 Claims, 4 Drawing Sheets

METHOD FOR PROCESSING A MEASUREMENT SIGNAL FROM A PRESSURE MEASUREMENT CELL, AND A MEASUREMENT CELL ARRANGEMENT

CROSS-REFERENCE TO RELATED APPLICATIONS

This application is a U.S. National Stage entry of PCT Application No. PCT/EP2016/052810, filed on Feb. 10, 2016, which claims priority from PCT Patent Application No. PCT/EP2015/060263, filed May 8, 2015, the contents of which are incorporated herein by reference.

BACKGROUND

The present invention relates to a method for processing a measuring signal of a pressure measuring cell and to a measuring cell arrangement having a pressure measuring cell.

It is known to measure pressures or pressure differences by applying pressure to a thin membrane and measuring the deflection resulting therefrom. A known and suitable method to measure the deflection of such membranes consists in designing the membrane arrangement as a variable electrical capacitance, the change in capacitance, which correlates with the change in pressure, being evaluated via an electronic measuring system. The capacitance is formed by the thin, flexible membrane surface being arranged at a small distance from a further surface of a body and both mutually opposite surfaces being designed to be electrically conductive. If the membrane and the body consist of non-conductive dielectric material, the surfaces are coated with an electrical coating, for example, as a result of which capacitor electrodes are formed. The membrane and/or the body can also themselves be formed of electrically conductive material, the surfaces again forming the capacitor electrodes in this case. If pressure is applied to the membrane, the distance between the two electrodes changes as a result of deflection, which leads to a change in capacitance that can be evaluated.

Sensors of this kind are produced in large numbers from silicon, for example. Both the flat base body and the membrane often consist entirely of silicon. There are also other embodiments a with combined composition of materials, e.g. silicon with a glass base. The sensors can thus be produced at low cost. Pressure sensors of this type can usually only be used for higher pressure ranges in the range of approximately $10^{-1}$ mbar to several bar. A high resolution at lower pressures from approximately $10^{-1}$ mbar can no longer be realized with silicon material. Sensors of this kind are not suitable for typical vacuum applications. For the various vacuum processes to be monitored, pressure measurements are often carried out in a vacuum between atmospheric pressure and $10^{-6}$ mbar. Such measurements require high sensitivity with high resolution and good reproducibility of the vacuum pressure measurement, which can only be provided by specially designed measuring cells which completely deviate from the design of the high-pressure measuring cell.

Capacitive membrane pressure measuring cells which are made of corrosion-proof materials such as $Al_2O_3$ are particularly suitable for vacuum pressure measurement. A known capacitive vacuum measuring cell, which is made substantially completely of ceramics and is largely corrosion-proof, is described in EP 1 070 239 B1. In order to enable the measurement of very low pressures up to $10^{-6}$ mbar with high precision, a very thin ceramic membrane with a thickness of 60 µm is used, for example, is used, which is arranged in a tension-free and symmetric manner in a ceramic housing.

The distance of the capacitor electrodes or the membrane surfaces from the surface of the housing body lies preferably in the range of 2 to 50 The diameters of such membrane pressure measuring cells lie preferably in the range of 5 to 80 mm. The thus formed capacitances to be measured lie in the range of 10 pF to 32 pF. Thanks to new electronics, it is now possible to measure capacitances in a range of 5 pF to 1000 pF. The measured capacitance is used as a measure for the pressure to be measured. This capacitance changes accordingly under a pressure-dependent deflection of the membrane, by means of which the pressure applied to the membrane can be detected. This measurement of the capacitance must take place highly precisely and is not easy to carry out in the case of very low capacitance values because the low capacitances lead to the consequence that the changes in capacitance caused by the changes in the pressure are extremely small. As a result, the electrical signals generated or derived therefrom are exceptionally low and thus susceptible to disturbances.

Correspondingly high demands are thus placed on the signal processing systems for processing pressure signals according to the comments made above.

Furthermore, filter algorithms are used for optimizing the properties of the measured pressure signals for further use, e.g. for controlling the pressure in process chambers. This is an attempt to provide a filter algorithm which simultaneously achieves two contradictory objectives for processing pressure signals. Firstly, a transient response, for example after a step-like change in the measuring signal, should be completed as rapidly as possible, i.e., the output signal of the filter should lead as quickly as possible to a stable output signal. As a result, any necessary action due to a change in pressure can be initiated as rapidly as possible. Secondly, a potential noise signal must be suppressed as strongly as possible by the filter algorithm. This therefore requires a filter that is as fast as possible according to the first condition, whereas a slow filter is instead desirable according to the second condition.

Numerous efforts are known to provide a filter algorithm and thus a transfer function for a filter for processing the measuring signal so as to achieve the two contradictory objectives. The known filter algorithms are based on compromises, which in the present application in pressure measurement using highly sensitive sensors, do not lead to satisfactory results.

U.S. Pat. No. 5,838,599 describes a variant for a filter, which permits both short transient responses during a rapid change in the input signal and a good reduction in the noise signal components in the input signal in the steady state.

Furthermore, reference is made to US 2013/0016888 A1, which discloses a complex computational method with a linear filter for eliminating noise.

SUMMARY

It is the object of the present invention to provide a simple method for processing a measuring signal in which a distinct suppression of the noise signal is achieved, but which simultaneously allows a rapid reaction to relevantly changing measuring signals.

This object is achieved by the features of claim 1. Advantageous embodiments and a measuring cell arrangement comprising a pressure measuring cell are provided in the further claims.

The method according to the invention for determining a pressure in a pressure cell consists in determining a measuring signal that is at least proportional to a measured pressure in the pressure cell, generating an output signal from the measuring signal using a filter unit comprising a transfer function by at least reducing and preferably eliminating a noise signal in the measuring signal, determining a change over time of the measuring, and setting the transfer function as a function of the change over time of the measuring signal.

In one embodiment of the method according to the invention, the pressure in the pressure cell is adjusted at least proportionally to the output signal. A closed control system that is extremely stable and robust is thus obtained.

The output signal is linear and thus excellently suited as the actual value for modern controllers (state controller).

In one embodiment of the method according to the invention, a transfer function has, at least in a first order, a low pass characteristic, the time constant thereof being adjusted as a function of the change over time of the measuring signal.

In further embodiments of the method according to the invention consist, an average value of the measuring signal is determined, a difference signal is determined by calculating the difference between the measuring signal and the average value of the measuring signal, and the change over time of the measuring signal is derived at least from the difference signal.

In further embodiments of the method according to the invention, the average value of the multiple substrate is determined, using an exponential average value filter, which is defined for a time-discrete measuring signal by $$f_n = \beta_1 \cdot x_n + (1-\beta_1) \cdot f_{n-1}$$

where f is the time-discrete output signal, $\beta_1$ is a variable, x is the time-discrete measuring signal, and n is a time-dependent index, the variable $\beta_1$ having in particular a value between 1 and 0, particularly preferably between 1 and 0.1, and very particularly preferably between 0.85 and 0.95.

In further embodiments of the method according to the invention, the change over time of the measuring signal is determined by formation of an average value of the difference signal.

In further embodiments of the method according to the invention, the change over time of the measuring signal is determined using an exponential average—value filter, which is defined for a time-discrete difference signal by $$\Delta x_n = \beta_2 e_n + (1-\beta_2) \Delta X_{n-1}$$

where $\Delta x_n$ is the time-discrete change in the measuring signal, $\beta_2$ is a variable, e is the time-discrete difference signal, and n is a time-dependent index, the variable $\beta_2$ having in particular a value between 1 and 0, particularly preferably between 0.5 and 0.01, very particularly preferably between 0.05 and 0.15.

In further embodiments of the method according to the invention, the time constant of the transfer function of a time-discrete system is defined by $$\tau = \Delta T \cdot \frac{1-\alpha}{\alpha}$$

where $\Delta T$ corresponds to the sampling interval in the time-discrete system and $\alpha$ is a variable those value is at least proportional to the change over time of the measuring signal, but does not go below a minimum value of $\alpha_{min}$, and does not exceed a minimum value of $\alpha_{max}$, the minimum value $\alpha_{min}$ being preferably between 0.0 and 0.1, particularly preferably between 0.0 and 0.01, and the minimum value $\alpha_{max}$ being in particular between 0.3 and 1.0.

In still further embodiments of the method according to the invention, the transfer function is defined by the formula $$y_n = \alpha \cdot x_n + (1-\alpha) \cdot y_{n-1}$$

where y is the time-discrete output signal, x is the time-discrete measuring signal, a is a variable whose value depends on the change over time of the measuring signal, and n is a time-dependent index.

In still further embodiments of the method according to the invention, the measuring signal is processed in a fast path in order to generate an output pulse, the output pulse of the fast path being active at least as long as the measuring signal change measured during at most three sampling intervals is greater than the noise measured in the same period in the measuring signal or in the measuring signal change.

In still further embodiments of the method according to the invention, the measuring signal is also processed in a slow path in order to generate a switching signal, the switching signal of the slow path being active at least as long as the change in the measuring signal measured for longer than 2*TS is greater than the noise measured in the measuring signal or in the measuring signal change in the same time period, TS being a predetermined pulse width of the output pulse, and the variable $\alpha$ obtains a value depending on an OR operation between the output pulse and the switching signal.

In still further embodiments of the method according to the invention, the variable $\alpha$ assumes either the value $\alpha_1$ or the value $\alpha_2$ at least after a predetermined transition time after a switching process, the value for $\alpha_1$ being in particular in the range of 0.01 to 0.9 and the value for $\alpha_2$ being in particular in the range of 0.0001 to 0.01.

In still further embodiments of the method according to the invention, switching from a value $\alpha_1$ to a value $\alpha_2$ takes place over a timespan $F_{in}$ and/or switching from a value $\alpha_2$ to a value $\alpha_1$ takes place over a timespan $F_{out}$.

The invention further relates to a measuring cell arrangement comprising a pressure cell and a membrane pressure measuring cell operatively connected to the pressure cell, which membrane pressure measuring cell generates a pressure-dependent measuring signal which is applied to a filter unit having a transfer function in order to generate an output signal, it being possible to determine a change over time of the measuring signal and to set the transfer function as a function of the change over time of the measuring signal.

In one embodiment of the measuring arrangement according to the invention, that the output signal can be used for adjusting the pressure in the pressure cell, in particular for adjusting the pressure in a process chamber.

In one embodiment of the measuring arrangement according to the invention, the transfer function has, at least in a first order, a low pass characteristic, it being possible to adjust the time constant thereof as a function of the change over time of the measuring signal.

In further embodiments of the measuring arrangement according to the invention, an average value of the measuring signal can be determined, a difference signal can be determined by calculating the difference between the measuring signal and the average value of the measuring signal, and the change over time of the measuring signal can be derived at least from the difference signal.

In further embodiments of the measuring arrangement according to the invention, the average value of the measuring signal can be determined using an exponential average-value filter, which is defined for a time-discrete measuring signal by $$f_n = \beta_1 \cdot x_n + (1-\beta_1) \cdot f_{n-1}$$

where f is the time-discrete average value of the measuring signal, $\beta_1$ is a variable, x is the time-discrete measuring signal, and n is a time-dependent index, the variable $\beta_1$ having in particular a value between 1 and 0, particularly preferably between 1 and 0.1, more particularly preferably between 0.85 and 0.95.

In further embodiments of the measuring arrangement according to the invention, the change over time of the measuring signal can be determined by formation of an average value of the difference signal.

In further embodiments of the measuring arrangement according to the invention, the change over time of the measuring signal can be determined using an exponential average-value filter, which is defined for a time-discrete difference signal by $$\Delta x_n = \beta_2 e_n + (1-\beta_2) \Delta x_{n-1}$$

where $\Delta x_n$ is the time-discrete change over time of the measuring signal, $\beta_2$ is a variable, $e_n$ is the time-discrete difference signal and n is a time-dependent index, the variable $\beta_2$ preferably has in particular having a value between 1 and 0, particularly preferably between 0.5 and 0.01, more particularly preferably between 0.05 and 0.15.

In further embodiments of the measuring arrangement according to the invention, the time constant of the transfer function of a time-discrete system is defined by $$\tau = \Delta T \cdot \frac{1-\alpha}{\alpha}$$

where $\Delta T$ corresponds to the sampling interval in the time-discrete system and $\alpha$ is a variable whose value is at least proportional to the change over time of the measuring signal, but does not go below a minimum value $\alpha_{min}$ and does not exceed a maximum value $\alpha_{max}$, the minimum value $\alpha_{min}$ being preferably between 0.0 and 0.1, particularly preferably between 0.0 and 0.01, and the minimum value $\alpha_{max}$ being in particular between 0.3 and 1.0.

In further embodiments of the measuring arrangement according to the invention, the transfer function is defined by the formula:

$$y_n = \alpha \cdot x_n + (1-\alpha) \cdot y_{n-1}$$

where y is the time-discrete output signal, x is the time-discrete measuring signal, $\alpha$ is a variable whose value depends on the change over time of the measuring signal, and is a time-dependent index.

In further embodiments of the measuring arrangement according to the invention, the measuring signal is applied to a fast path in order to generate an output pulse, the output pulse of the fast path being active at least as long as the measuring signal change measured during at most three sampling intervals is greater than the noise measured in the same period of time in the measuring signal or in the measuring signal change.

In further embodiments of the measuring arrangement according to the invention, the measuring signal is also applied to a slow path in order to generate a switching signal, the switching signal of the slow path being active at least as long as the change in the measuring signal measured for longer than 2*TS is greater than the noise measured in the measuring signal or in the measuring signal change in the same time period, TS being a minimum pulse width of the output signal, and the variable $\alpha$ acquires a value depending on an OR operation between the output pulse and the switching signal.

In further embodiments of the measuring arrangement according to the invention, the variable $\alpha$ assumes either the value $\alpha_1$ or the value $\alpha_2$ after a predetermined transition time following a switching process, the value for $\alpha_1$ being in particular in the range of 0.01 to 0.9, and the value for $\alpha_2$ being in particular in the range of 0.0001 to 0.01.

In further embodiments of the measuring arrangement according to the invention, a transition unit is provided between the filter unit and the decision unit, in which transition unit switching from a value of a1 to a value of $\alpha_2$ takes place over a timespan $F_{in}$ and/or switching from a value of $\alpha_2$ to a value $\alpha_1$ takes place over a timespan $F_{out}$.

It is pointed out that the above embodiments can be combined in any manner desired. This excludes only the combinations of embodiments that would by combination lead to a contradiction.

DESCRIPTION OF THE DRAWINGS

Embodiments of the present invention are explained in more detail below with reference to drawings, in which.

DETAILED DESCRIPTION

Figure 1:
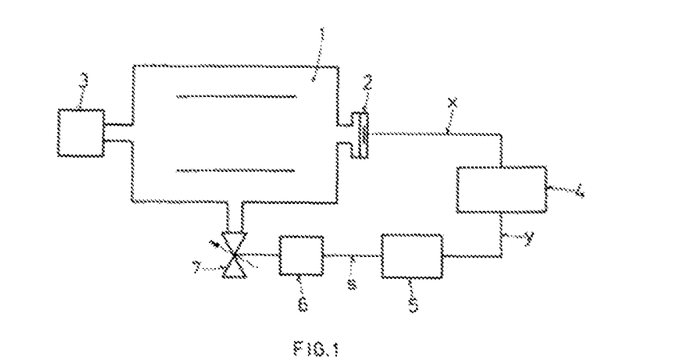
FIG. 1 shows a measuring cell arrangement comprising a membrane pressure measuring cell connected to a process chamber, by means of which membrane pressure measuring cell a measuring signal is determined which is supplied to a valve after processing according to the invention.

FIG. 1 shows in a highly simplified block diagram, a measuring cell arrangement comprising a process chamber 1, a membrane pressure measuring cell 2, a vacuum pump 3, a signal processing unit 4, a control unit 5, a valve actuator 6, and a valve 7. The membrane pressure measuring cell 2 is used for determining the pressure in the process chamber 1 by a pressure that is predetermined in accordance with the specification of a vacuum process being adjusted. Vacuum processes comprise diverse methods, such as coating procedures, etching procedures, heat treatment of workpieces, etc. Vacuum processes are also often carried out with supporting gases, which are needed both actively as a reactive gas or as an inert case in the process. The gases are supplied for this purpose to the process chamber 1 via the valve 7 controlled by the valve actuator 6, by means of which valve the gas supply and the pressure in the process chamber 1 can be controlled. By means of the membrane pressure measuring cell 2, a measuring signal x is generated which is processed in the signal processing unit 4 and the control unit 5 to form a control signal s for the valve actuator 6. For precise process control, it is necessary for the membrane pressure measuring cell 2 on the one hand to be as precise as possible, but on the other hand to also makes quick measurements in order to be able to react as quickly and precisely as possible to pressure changes in the process chamber 1.

It is also conceivable—in a simplified embodiment of the present invention—that the output signal y of the signal processing unit 4 is not used for controlling the pressure in a process chamber. In this case this is not a closed system but an open system. Here, a pressure is measured in a pressure cell of any desired type similarly to in the process chamber according to FIG. 1 by a pressure measuring cell 2. The measuring signal x measured by the pressure measuring cell 2 is likewise processed in a signal processing unit 4 in order to obtain an output signal y that is stable and noise-free but reacts quickly to changes.

The invention now relates again with consideration of the embodiments according to FIG. 1 to processing the measuring signal x in the context of conditions present in a vacuum process and above all is intended for optimal signal processing of the measuring signal x, as it can occur as the pressure signal in such vacuum processes. Here, the signal processing in the signal processing unit can fundamentally take place in analog or digital form, although there will be no discussion in the following of the special preparations that are carried out when signal processing is in analog or digital form as such preparations (analog/digital conversion, filtering to avoid aliasing, selection of sampling frequency, etc.) are sufficiently known to a person skilled in the art.

The output signal y of the signal processing unit 4 is processed further in the control unit 5 for example by a so-called P-, PI-, PID or state controller. The controller implemented in the control unit 5 is responsible in particular for optimal tracking of the control signal s for the valve actuator 6 or for the valve 7.

In principle, the statements regarding processes in the signal processing unit 4 and the block diagrams thereof apply both to the embodiments in a closed system and to the embodiments in an open system.

Figure 2:
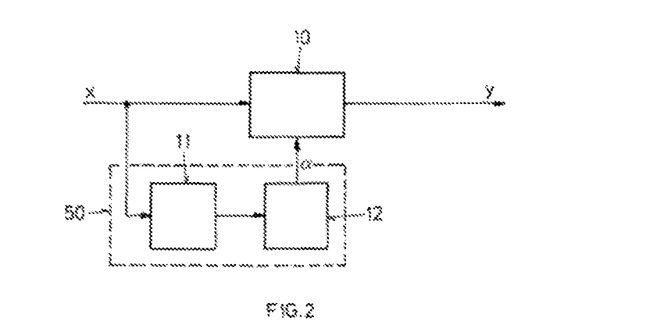
FIG. 2 is a block diagram of the signal processing unite-according to FIG. 1 comprising a calculation unit for processing the measuring signal.

FIG. 2 is a schematic and simplified block diagram for illustration of the processing steps that are carried out in the signal processing unit 4 (FIG. 1) according to the present invention. In order to implement the processing steps of the algorithm according to the invention, a signal processor is used, for example, which is accordingly programmed. Of course the signal processor can also perform other tasks if the processor capacity is sufficient. In particular, it is conceivable that the controller of the control unit 5 is implemented in the same signal processor.

As is clear from FIG. 2, the measuring signal x is supplied to a filter unit 10 that generates the output signal y. The filter unit 10, together with the measuring signal x and the output signal y, forms the actual signal path of the signal processing unit 4 (FIG. 1). The remaining components that are still to be explained such as the calculation unit 11 and the decision unit 12, are provided for establishing the characteristic of the filter unit 10.

The filter unit 10 has a filter characteristic that is defined in a time-discrete system according to the following equation, for example:

$$y_n = \alpha \cdot x_n + (1-\alpha) \cdot y_{n-1}$$

Here, y is the time-discrete output signal, x is the time-discrete measuring signal, n is a time-dependent index, and a is a variable whose value decisively determines the time constant of the filter unit 10. The object of the present invention is that of optimally setting the value for the variable $\alpha$ in such a way that a noise signal in the measuring signal x is suppressed as far as possible or even eliminated, but at the same time a changing pressure in the process chamber is identified so as to be able to react thereto with the appropriate speed.

The mentioned equation with the variable $\alpha$ has, as the filter characteristic for suppression of the noise signal portion, a low pass characteristic, where the time constant T can be defined for a first-order filter as follows:

$$\tau = \Delta T \cdot \frac{1-\alpha}{\alpha}$$

The choice of values for the variable $\alpha$ is decisive for the present invention. If the measuring signal x receives only a noise signal in the event of a stable pressure value, the value of $\alpha$ is to be selected to be as small as possible ($\alpha_{min}$), for example 0.01. In this way, the noise signal present in the measuring signal x is maximally suppressed and the filtered output signal y is preferably suited for use in the downstream controller of the control unit 5 (FIG. 1), as a stable output signal leads to lower activity of the valve actuator 6 or of the valve 7 and thus to a reduced load on these components, as a result of which the probability of failure thereof is considerably reduced with respect to known systems.

On the other hand, a change in the measuring signal x based on an actual pressure change in the process chamber must be detected without delay, which makes a different value for the variable $\alpha$ necessary, namely for example a value for a between 0.3 and 1.0 ($\alpha_{max}$).

The value for the variable $\alpha$ is adjusted according to the invention depending on the change over time of the measuring signal x, which is explained below in detail.

Figure 3:
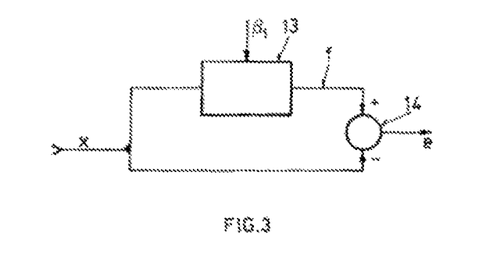
FIG. 3 is a block diagram of a first embodiment of the calculation unit according to FIG. 2.

FIG. 3 is a schematic illustration of a block diagram of a first embodiment for defining the change over time of the measuring signal x. Essentially, the measuring signal x is smoothed out in a smoothing unit 13, for example using an average-value filter. It has been shown that in particular a so-called exponential average-value filter is particularly suitable in this case. The output signal f of this filter is sent to a difference unit 14, which determines the difference from the unchanged measuring signal x, which is also referred to below as a difference signal e.

The difference signal e is a measure for the change over time of the measuring signal x and is used in this embodiment according to the invention for setting the value for the variable $\alpha$ in the filter unit 10 (FIG. 2), although scaling may still be necessary.

The smoothing unit 13 implemented by means of an exponential average-value filter is defined by the recursive formula $$f_n = \beta_1 \cdot x_n + (1-\beta_1) \cdot f_{n-1}$$

where f is the time-discrete output signal, $\beta_1$ is a variable, x is the time-discrete measuring signal and n is a time-dependent index, the variable $\beta_1$ having, in the case of the exponential average-value filter for generating the difference signal f, a value in particular between 1 and 0, particularly preferably between 1 and 0.1, more particularly preferably between 0.85 and 0.95.

The calculation unit 11 according to FIG. 2 in the embodiment according to FIG. 3 thus generates a difference signal e as follows:

$$e_n = f_n - x_n$$

FIG. 4 is a block diagram, again in schematic illustration, of a further embodiment of the calculation unit 11 (FIG. 2). This relates to producing the change over time of the measuring signal x, also referred to as Δx, in two stages, the first stage being identical to the individual stage according to FIG. 3. According to FIG. 4, further processing of the difference signal e is carried out by an average-value filter 15, which average-value filter can again for example be implemented as an exponential average-value filter.

Figure 4:
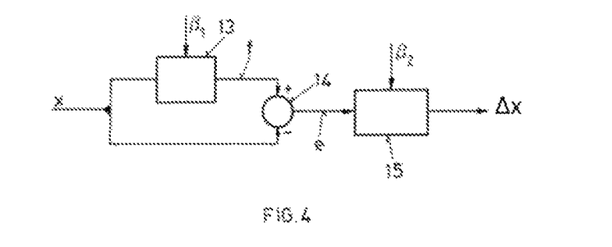
FIG. 4 shows is a block diagram of a second embodiment of the calculation unit according to FIG. 2.

Consequently, the same definitions apply; see above formulations, as already given for the first stage. Individually the value for the variable β, which was accordingly referred to as $β_2$, has a different value: the variable $β_2$ preferably obtains, in the case of the exponential average-value filter for determining the change over time of the measuring signal x, a value in particular between 1 and 0, in particular between 0.5 and 0.1, in particular a value between 0.05 and 0.15.

The change over time Δx of the measuring signal x can thus be defined as follows from the time-discrete difference signal e:

$$\Delta x_n = \beta_2 e_n + (1-\beta_2)\Delta x_{n-1}$$

where $\Delta x_n$ is the time-discrete change over time of the measuring signal x, $e_n$ is the time-discrete difference signal e, and n is a time-dependent index.

In this embodiment of the present invention, the change over time Δx or $\Delta x_n$ obtained hereby of the measuring signal x may also need to be scaled, as has already been explained in connection with the embodiment according to FIG. 3.

Figure 5:
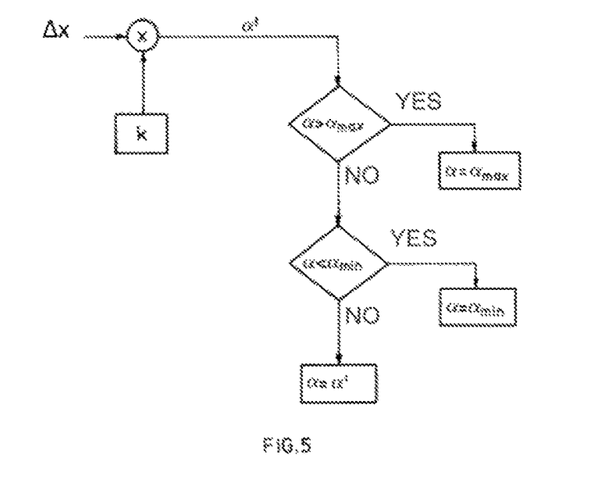
FIG. 5 is a signal flow diagram that depicts the method steps taking place in a decision unit.

FIG. 5 shows a further embodiment of the present invention, this embodiment being a special design of the decision unit 12 (FIG. 2). According to the embodiments already explained with reference to FIGS. 3 and 4, the decision unit 12 may comprise scaling of the change over time Δx of the measuring signal x obtained by the calculation unit 11. In continuation of this embodiment of the invention, it is proposed that the range of values for the values α be limited at the lower and upper end. Correspondingly, according to the further embodiments of the present invention shown in FIG. 5, an $α_{min}$ and an $α_{max}$ are provided, these taking effect in accordance with the flow diagram shown in FIG. 5:

The change over time Δx of the measuring signal x is scaled with a factor k (as already explained in connection with the embodiments shown in FIGS. 3 and 4). The scaled change over time Δx is referred to as α'. There now follows a series of decisions that have the objective of limiting the establishment of a within a range of values between a minimum value $α_{min}$ and a maximum value $α_{max}$. Between the extreme values $α_{min}$ and $α_{max}$, the value of a is accordingly set in accordance with the result of the calculation unit 11 (FIG. 2), whether the latter was implemented according to FIG. 3 or according to FIG. 4.

Figure 6:
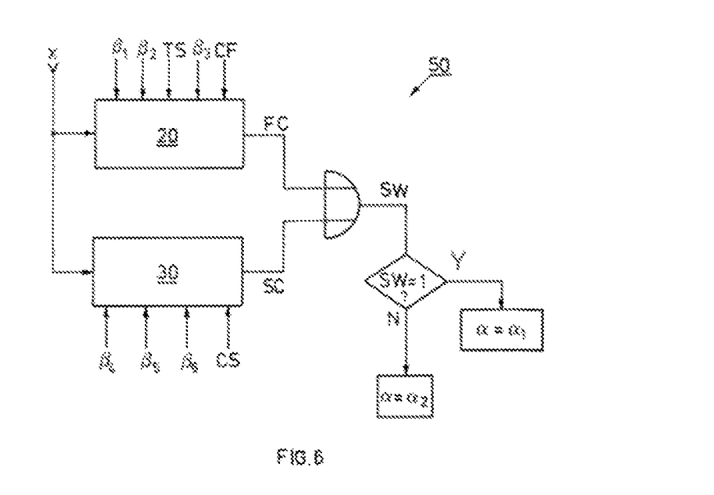
FIG. 6 shows is a block diagram of a further embodiment of the calculation and decision unit according to the invention having a fast and a slow signal path.

FIG. 6 shows a further embodiment of the present invention, in this case in schematic illustration of a block diagram being shown for the calculation unit 11 and the decision unit 12 shown in FIG. 2, which in FIG. 2 are enclosed in dashed lines and are also referred to below as the slope determination unit 50.

All of the following specific numerical examples (in particular for the time constant τ) proceed from a typical sampling time ΔT (referred to as the cycle time) of 1 ms. Of course the sampling time ΔT of 1 ms serves only as an example. The sampling time ΔT is fundamentally selected within the scope of the available calculating performance and the necessary reaction time of the entire system.

As is clear from FIG. 6, the slope determination unit 50 initially comprises two functional blocks namely the "fast" block 20 and the "slow" block 30. These two functional blocks 20 and 30, which are yet to be explained, are also referred to as the fast path 20 and the slow path 30.

In terms of quality, the following principles can be formulated with regard to the parameters $α_1$ and $α_2$ of the filter unit 10 (FIG. 2):

Measuring signals x that do not change as a function of time (i.e. if no pressure changes are present) can be filtered intensely so as to maintain maximum noise suppression. It has been shown that for the parameter $α_2$, values between 0.0001 (τ≈10 s) and 0.01 (τ≈100 ms) are suitable. A preferred value for the parameter $α_2$ is 0.001 (τ'1 s).

Measuring signals x that do change as a function of time if pressure changes are present) need to be less intensely filtered. In this case, the parameter $α_1$ defines the damping factor. This is therefore typically selected to be greater than the parameter $α_2$. It has been shown that for the parameter $α_1$, values between 0.1 (τ≈100 ms) and 0.9 (τ≈0.1 ms) are suitable. A preferred value for the parameter $α_1$ is 0.1 (τ≈9 ms).

As already mentioned, the slope determination unit 50 initially consists of the two functional blocks "fast" 20 and "slow" (30, the functional block "fast" generating an output signal FC for fast changes and the functional block "slow" 30 generating an output signal SC for slow changes, from which a control signal SW is obtained by an "OR" operation as follows:

$$SW = FC \text{ OR } SC$$

The result of an active control signal SW—as follows from the flow diagram of FIG. 6 after the OR gate—is that the value $α_1$ is used in the filter unit 10 (FIG. 2). On the other hand, $α_2$ is used in the filter unit 10 when the control signal SW is inactive.

The functional block "fast" 20 detects and reacts within a sampling interval ΔT (where the sampling interval ΔT is in turn 1 ms, for example) to fast changes of the measuring signal x, but is relatively insensitive to slow or constant measuring signal changes. The slow or constant measuring signal changes are detected by the functional block "slow" 30.

The boundary between slow and fast measuring signals x is indicated by the functional block "fast" 20:

If the frequency of the measuring signal x is smaller than $$\frac{1}{2 \cdot TS},$$

this is a slow measuring signal x from the standpoint of the functional block "fast" 20; otherwise it is a fast measuring signal x. The meaning of these statements and the resultant reaction will be examined in detail in connection with the explanations of the functional blocks 20 and 30.

Figure 7:
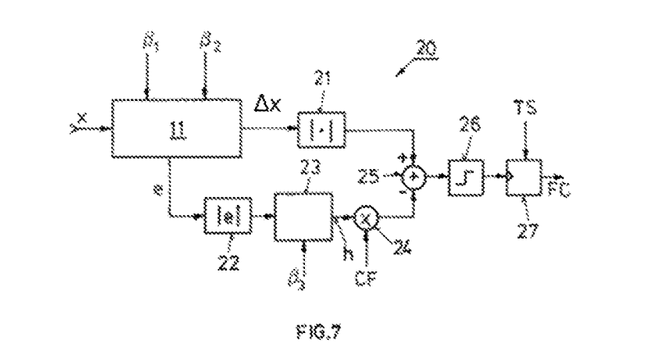
FIG. 7 shows is a block diagram for the fast signal path according to the invention according to FIG. 6.

FIG. 7 shows the functional block "fast" 20 according to FIG. 6. The measuring signal x is sent to the calculation unit 11, which is shown in FIG. 4 and is explained in detail. Accordingly, those statements are also valid for this embodiment of the invention.

The output signal αx of the calculation unit 11 is sent to a value unit 21, in which the value of αx is determined and sent to an addition unit 25. In a further value unit 22, the value of the difference signal e likewise determined in the calculation unit 11 is obtained. The value signal |e| is then again smoothed in an average-value filter 23 with the parameter $\beta_3$ according to the following formula:

$$h_n = \beta_3 \cdot |e_n| + (1-\beta_3) \cdot h_{n-1}$$

the output signal $h_n$ being sent to the additional unit 25 after scaling with the factor CF in a multiplication unit 24, in which additional unit the $$\left[\frac{\Delta x}{\Delta T}\right]$$

difference between the value signal Δx and CF·h is determined. The result is sent to a threshold value detector 26, which produces a trigger when a predetermined threshold value is exceeded, which trigger is sent to a monoflop 27. The monoflop 27, which is formed for example as a retriggerable monoflop, generates an output pulse CF after receipt of a trigger at the input, the length of which output pulse can be set over the pulse width TS. In this regard, "retriggerable" means that a trigger arriving during the time process restarts the internal time of the monoflop 27 each time and the active switching state is accordingly extended in time.

As already explained, the signal αx constitutes a measure for the change in the measuring signal x. By filtering of the amount of the difference signal e with the average value filter 23 and subsequent scaling with the factor CF, the signal CF·h is obtained. This is now a measure for the "basic noise" of the measurement of the measuring signal change Δx. By comparing the signals CF·h and the amount of Δx, the binary control signal "trigger" is thus obtained, which is used to control the monoflop 27.

It has been shown that the damping factors $\beta_1$ and $\beta_2$ and $\beta_3$ should have in particular the following values:

For $\beta_1$ in a range of 0.1 to 0.001 (τ≈9 ms to 1 s), in particular 0.01 (τ≈100 ms) as a typical value; for $\beta_2$ in the range of 01 to 0.001 (τ≈9 ms- . . . 1 s), in particular 0.01 (τ≈100 ms) as a typical value; and for $\beta_3$ in the range of 0.01 to 0.0001 (τ≈100 ms to 10 ms), in particular 0001 (τ≈1 s) as a typical value.

Proceeding from the pressure monitoring and pressure adjustment system shown in FIG. 1, the following can be established: each fast pressure change (pressure jump) in the process chamber 1 generates a "trigger pulse." The width of this pulse depends on the selected damping factors $\beta_1$ and $\beta_2$. In particular small pressure changes in real vacuum systems have time constants in the range >10 ms. In order to ensure that there is no switching within a pressure change (flank) between the fast and slow filter, a retriggerable monoflop 27 is used to ensure that the output pulse FC has at least the pulse width TS. The preferred value range for the pulse width TS lies for example between 50 ms (in particular in small, fast vacuum systems) and 5 s (in particular in a large, slow vacuum systems). A typical value for the pulse width TS is 500 ms. The scaling factor CF example has a value of 0.15, for example.

For measuring signals x which have frequencies smaller than $$\frac{1}{2 \cdot TS},$$

the functional block "fast" 20 (FIG. 6) does not respond or responds with lower reliability than desired. This is in particular because the pulse width TS of the monoflop 27 (FIG. 7) is too short to be able to cover a full signal period. Measuring signals x having a frequency of less than 1/2·TS are therefore processed "slowly" by the functional block in the embodiment shown in FIG. 6. It is expressly pointed out, however, that very good results can already be obtained with the functional block "fast" 20 alone—i.e. without the functional block "slow" 30.

Figure 8:
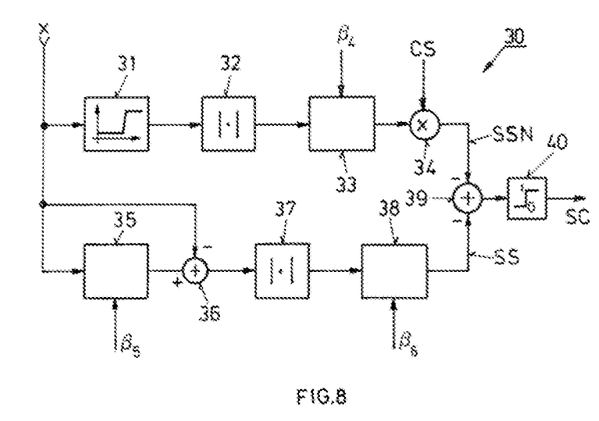
FIG. 8 is a block diagram for the slow signal path according to the invention according to FIG. 6.

One embodiment for the functional block "slow" 30 (see FIG. 6) is shown in FIG. 8. Reference signs 32 and 37 provide "absolute value" operations performed on the respective input signals, reference signs 36 and 39 are additions unit for their respective inputs, and reference sign 40 refers to the generation of a switching signal SC. Here the functional block "slow" 30 is set up for measuring signals x having a frequency of less than $$\frac{1}{2 \cdot TS},$$

the frequencies typically being smaller than 1 Hz, assuming a pulse width TS of 500 ms, for example. The functional block "slow" 30 calculates a switching signal SC as an output signal as follows:

$$SC = \begin{cases} \text{active} & \text{if } SSN < SS \\ \text{inactive} & \text{if } SSN \geq SS \end{cases}$$

SS is a measure for the change in the measuring signal x over a longer time period, which for example is longer than 2·TS (i.e., double the pulse width TS) and thus typically amounts to seconds, and where SSN is a measure for the noise of the measuring signal x. Both SSN and SS are determined using the average-value filters of the type already described. The transfer function of the average-value filter has been explained in connection with the description of the filter unit 10 of FIG. 2.

SS is obtained with the further average-value filters 35 and 38 (FIG. 8) analogously to the average-value filters 13 of FIG. 4 and 15 of FIG. 7. The only difference lies in the size of the damping factors $\beta_5$ and $\beta_6$, which are now optimized for smaller frequency ranges.

It has been shown that the damping factors $\beta_5$ and $\beta_6$ should have in particular the following values:

For $\beta_5$ in the range of 0.01 to 0.0001 (r 100 ms to 10 s), in particular 0.001 (τ≈1 s) as a typical value; and for $\beta_6$ in the range of 0.1 to 0.0001 (τ=100 ms to 10 s), in particular 0.001 (τ≈1 s) as a typical value.

The signal SS calculated in the manner just described is substantially a measure for the sum of the change in the measuring signal x and the noise of the measuring signal x. The independent signal SSN is now calculated from (slow) changes of the measuring signal x by a high pass filter 31 and a further average-value filter 33. This is thus a measure for the noise of the measuring signal x, and by comparison with the signal SS, the desired switching signal SC according to the conditions indicated above is obtained.

It has been shown that the damping factors $\beta_4$ should lie in a range, for example, of 0.005 to 0.00005 ($\tau \approx 200$ ms to 20 s), in particular should be equal to 0.0005 ($\tau \approx 2$ s).

The output signal of the average-value filter 33 is connected for scaling to a multiplier unit 34, to the second input of which a scaling factor CS is applied in order to generate the output signal SSN. It has been shown that the scaling factor CS has a value of 50, for example.

The object of the high pass filter 34 is that of separating noise and slow changes in the measuring signal x. Assuming that the noise of the measuring signal is distributed normally over the assessable frequency range of 0- ... 1 kHz (with a typical sampling interval $\Delta T$ of 1 ms), a high pass filter 34 according to the following configuration has proven to be suitable:

filter type: high pass filter
design method: elliptical
sampling frequency: 1 kHz
cutoff frequency in pass band: 400 Hz
oscillations in pass band: 3 dB
cutoff frequency in stop range: 250 Hz
damping in stop range: 73 dB Under these conditions, a fourth-order high pass filter is produced, which can be calculated and implemented easily, i.e. with reasonable outlay.

Figure 9:
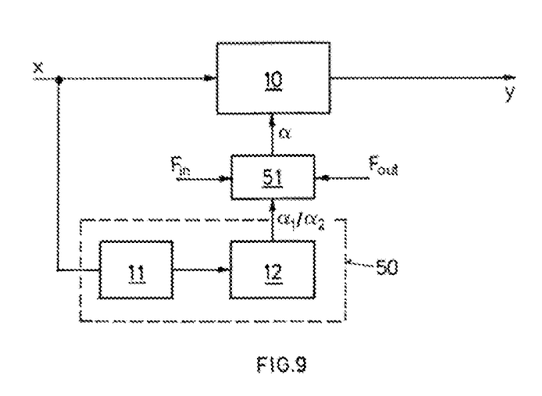
FIG. 9 shows, proceeding from FIG. 2, a further embodiment comprising a transition unit between the calculation unit and the filter unit.

FIG. 9 shows a further embodiment of the present invention, in which the filter unit 10 according to the invention switches optimally quickly and accordingly abruptly between the two damping factors $\alpha_1$ and $\alpha_2$. It is conceivable that this abrupt switching is not tolerated by all of the subsequent controllers in the control unit 5 (FIG. 1). Therefore, the switching between $\alpha_1$ and $\alpha_2$ according to the now further developed embodiment of the invention can be designed to be less abrupt by activation of a fade-in/fade-out option. For this purpose—as is clear from FIG. 9—a transition unit 51 is provided between the determination unit 50 and the filter unit 10. The transition unit 51 is provided with two additional parameters $F_{in}$ and $F_{out}$.

In the following, the function of the transition unit 51 is explained: the two additional parameters $F_{in}$ and $F_{out}$ define two timespans, which are used in switching the damping factor of $\alpha_1$ to $\alpha_2$ or vice versa, depending on the transition direction either the timespan $F_{in}$ or the timespan $F_{out}$ being definitive depending on the transition direction. If the switch has to be made from $\alpha_2$ to $\alpha_1$ (i.e. a pressure change occurs), the timespan $F_{in}$ is used during which a soft transition from $\alpha_2$ to $\alpha_1$ is carried out. In the reverse direction—i.e. when stable pressure conditions again dominate after a pressure change—the switch must be from $\alpha_1$ to $\alpha_2$. According to this, embodiment this likewise no longer takes place abruptly, but within the timespan defined by $F_{out}$. Again a "softer" transition from $\alpha_1$ to $\alpha_2$ takes place.

It has been shown that for the two timespans $F_{in}$ or $F_{out}$, for example, the following values are suitable:

For the timespan $F_{in}$ in the range of 0 to 100 ms, in particular 10 ms as a typical value; and for the timespan $F_{out}$ in the range of 0 to 10 s, in particular 1 s is a typical value.

The invention claimed is:

1. A method of determining a pressure in a process chamber having a membrane pressure cell therein, in accordance with a specification of a vacuum process, wherein the method comprises:

determining, in a signal processor a measuring signal that is at least proportional to a measured pressure in the membrane pressure cell, generating an output signal using a filter unit comprising a transfer function derived from the measuring signal by at least reducing a noise signal contained in the measuring signal, wherein the transfer function is defined by the formula $$y_n = \alpha x_n + (1-\alpha) y_{n-1}$$

wherein $y_n$ is a time-discrete output signal, $x_n$ is a time-discrete measuring signal, $\alpha$ is a variable whose value depends on the change over time of the measuring signal, and n is a time-dependent index, determining a change over time of the measuring signal, and processing, in the signal processor, the measuring signal in a fast path for generating an output pulse, wherein the output pulse of the fast path is active for at least as long as the determined change over time of the measuring signal over three sampling intervals is greater than the noise signal acquired in the same time period, which noise signal is contained in the measuring signal or in a measuring signal change acquired in the same time period, wherein the output pulse is provided by a control unit to a valve actuator, to control the pressure in the process chamber.

2. The method according to claim 1, further comprising adjusting the pressure in the membrane pressure cell at least proportional to the output signal.

3. The method according to claim 1, characterized in that the transfer function has at least a first order low pass characteristic, and further comprises adjusting its time constant as a function of the change of the measuring signal.

4. The method according to claim 1, further comprising:
determining an average value of the measuring signal,
determining a difference signal by calculating the difference between the measuring signal and the average value of the measuring signal, and
deriving the change over time of the measuring signal at least from the difference signal.

5. The method according to claim 4 further comprising determining the average value of the measuring signal using an exponential average filter, which is defined for a time-discrete measuring signal by $$f_n = \beta_1 x_n + (1-\beta_1) f_{n-1}$$

wherein $f_n$ is the time-discrete average of the measuring signal, $\beta_1$ is a variable, $x_n$ is the time-discrete measuring signal, and n is a time-dependent index, wherein the variable $\beta_1$ has a value between 1 and 0.

6. The method according to claim 4, further comprising determining the change over time of the measuring signal by formation of an average of the difference signal.

7. The method according to claim 4, further comprising determining the change of the measuring signal using an exponential average filter, which is defined for a time-discrete difference signal by $\Delta X_n = \beta_2 e_n + (1-\beta_2) \Delta x_{n-1}$ where $\Delta x_n$ is the time-discrete time change of the measuring signal, $\beta_2$ is a variable, $e_n$ is the time-discrete difference signal and n is a time-discrete index, wherein the variable $\beta_2$ has a value between 1 and 0.

8. The method according to claim 1, further comprising processing the measuring signal in a slow path for generating a switching signal, the switching signal (SC) of the slow path being active at least as long as the determined change over time of the measuring signal, measured longer than 2*TS, is greater than the noise in the measuring signal measured in the same time period or in the measuring signal change, wherein TS is a predefined minimal pulse width of the output pulse and that the variable $\alpha$ obtains a value depending on an OR operation between the output pulse and the switching signal.

9. The method according to claim 1, comprising assigning either a value $\alpha_1$ or a value $\alpha_2$ to the variable $\alpha$ at least after a predetermined transition time after a switching process, wherein the value $\alpha_1$ lies in the range of 0.01 to 0.9 and wherein the value $\alpha_2$ lies in the range of 0.0001 to 0.01.

10. The method according to claim 9, comprising switching from the value $\alpha_1$ to the value $\alpha_2$ taking place over a finite timespan $F_{in}$.

11. The method according to claim 9, comprising switching from the value $\alpha_2$ to the value $\alpha_1$ taking place over a finite timespan $F_{out}$.

12. A measuring signal arrangement comprising a membrane pressure measuring cell operatively connected to a process chamber, the membrane pressure measuring cell comprising a filter unit generating a pressure-dependent measuring signal, which is applied to the filter unit and generating an output signal, wherein a change of the measuring signal is determined, and wherein the transfer function is adjusted as a function of the change over time of the measuring signal, the transfer function being defined by the formula:

$$y_n = \alpha x_n + (1-\alpha) y_{n-1}$$

wherein $y_n$ is the time-discrete output signal, $x_n$ is the time-discrete measuring signal, $\alpha$ is a variable whose value depends on the change over time of the measuring signal, and n is a time-dependent index, wherein the measuring signal is applied to a fast path to generate an output pulse, the output pulse of the fast path being active at least as long as the determined change of the measuring signal during at least three sampling intervals is greater than the noise signal acquired in the same time period, which noise signal is contained in the measuring signal or in a measuring signal change acquired in the same time period.

13. The measuring signal arrangement according to claim 12, wherein the output signal is used for adjusting the pressure in the membrane pressure measuring cell.

14. The measuring signal arrangement according to claim 12, wherein the transfer function comprises a low pass characteristic of at least first order, the time constant of which is adjustable as a function of the change over time of the measuring signal.

15. The measuring signal arrangement according to claim 14, wherein an average of the measuring signal is determined by calculating the difference between the measuring signal and the average value of the measuring signal, and wherein the change over time of the measuring signal is derived at least from the difference signal.

16. The measuring signal arrangement according to claim 15, wherein the average of the measuring signal is determined using an exponential average filter, which is defined for a time-discrete measuring signal by $f_n = \beta_1 \cdot x_n + (1-\beta_1) \cdot f_{n-1}$
wherein $f_n$ is the time-discrete average of the measuring signal, $\beta_1$ is a variable, $x_n$ is the time-discrete measuring signal, and n is a time-dependent index, wherein the variable $\beta_1$ has a value between 1 and 0.

17. The measuring signal arrangement according to claim 16, wherein the change over time of the measuring signal is determined by formation of an average of the difference signal.

18. The measuring signal arrangement according to claim 15,
wherein the change over time of the measuring signal is determined using an exponential average filter, which is defined as a time-discrete difference signal by $\Delta x_n = \beta_2 e_n + (1-\beta_2) \Delta x_{n-1}$ wherein $\Delta x$ is the time-discrete change over time of the measuring signal, $\beta_2$ is a variable, $e_n$ is the time-discrete difference signal and n is a time-dependent index, wherein the variable $\beta_2$ has a value between 1 and 0.

19. The measuring signal arrangement according to claim 12, wherein the measuring signal is further applied to a slow path for generating a switching signal, the switching signal of the slow path being active at least as long as the determined change over time of the measuring signal, measured longer than 2*TS, is greater than the noise in the measuring signal during the same time period or in the measuring signal change, wherein TS is a predefined minimal pulse width of the output pulse, and that the variable $\alpha$ obtains a value depending on an OR operation between the output pulse and the switching signal.

20. The measuring signal arrangement according to claim 12, wherein either a value $\alpha_1$ or a value $\alpha_2$ is assigned to the variable $\alpha$ at least after a predetermined transition time after a switching process, wherein the value $\alpha_1$ lies in the range of 0.01 to 0.9, and wherein the value $\alpha_2$ lies in the range of 0.0001 to 0.01.

21. The measuring signal arrangement according to claim 12, further comprising a transition unit associated with the filter unit seen in a direction given by a signal flow path, the transition unit switching from a value $\alpha_1$ to a value $\alpha_2$ during a finite timespan $F_{in}$ and/or switching from a value $\alpha_2$ to a value at during a finite timespan $F_{out}$.

* * * * *